(12) United States Patent
Hastings et al.

(10) Patent No.: US 10,533,664 B1
(45) Date of Patent: Jan. 14, 2020

(54) ROTARY VANE RADIAL SEAL ASSEMBLY SYSTEM

(71) Applicants: Nathan Hastings, Dallas, TX (US); Stephan Hastings, Hemet, CA (US); Frank T. Klisura, Norco, CA (US)

(72) Inventors: Nathan Hastings, Dallas, TX (US); Stephan Hastings, Hemet, CA (US); Frank T. Klisura, Norco, CA (US)

(*) Notice: Subject to any disclaimer, the term of this patent is extended or adjusted under 35 U.S.C. 154(b) by 605 days.

(21) Appl. No.: 15/081,866

(22) Filed: Mar. 26, 2016

(51) Int. Cl.
| F16J 15/3268 | (2016.01) |
| F16J 15/3216 | (2016.01) |
| F28D 19/04 | (2006.01) |
| F27B 7/24 | (2006.01) |
| F16J 15/34 | (2006.01) |
| F16J 15/32 | (2016.01) |
| F23L 15/02 | (2006.01) |

(52) U.S. Cl.
CPC ....... *F16J 15/3268* (2013.01); *F16J 15/3216* (2013.01); *F28D 19/047* (2013.01); *F27B 7/24* (2013.01)

(58) Field of Classification Search
CPC ........ F28D 19/047; F16J 15/3268; F27B 7/24
USPC ................... 165/8, 9; 277/307, 355
See application file for complete search history.

(56) References Cited

U.S. PATENT DOCUMENTS

| 2,549,656 | A | 4/1951 | Yerrick et al. |
| 2,670,183 | A | 2/1954 | Hammond et al. |
| 2,674,442 | A | 4/1954 | Hammond et al. |
| 4,098,323 | A | 7/1978 | Wiegard |
| 4,593,750 | A | 6/1986 | Finnemore |
| 4,673,026 | A | 6/1987 | Hagar et al. |
| 5,005,634 | A * | 4/1991 | Reeves ............... F28D 19/047 165/9 |
| 5,697,619 | A | 12/1997 | Fierie |
| 6,789,605 | B1 | 9/2004 | Kaser |
| 7,231,958 | B1 * | 6/2007 | Kaser ................. F23L 15/02 165/9 |
| 7,416,016 | B1 | 8/2008 | Kaser |
| 2009/0145574 | A1 | 6/2009 | Klisura |
| 2011/0036536 | A1 | 2/2011 | Klirsura et al. |

* cited by examiner

*Primary Examiner* — Paul Alvare
(74) *Attorney, Agent, or Firm* — Law Office of Sam Sokhansanj PLLC

(57) ABSTRACT

A radial seal assembly is disclosed for a regenerative heat exchanger. The radial seal assembly can include a mount having a first upstanding region and a first arcuate region. Here, the first upstanding region is configured to attach to a diaphragm of the heat exchanger. The radial seal assembly further includes a flexible radial contact or non-contact seal, wherein the seal further includes a second arcuate region. Here, the first arcuate region of the mount is configured to receive the second arcuate region of the flexible seal and securing the flexible seal therein.

11 Claims, 8 Drawing Sheets

REAR VIEW

ROTARY VANE RADIAL SEAL ASSEMBLY SYSTEM

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Conventional rotary seals are employed in a wide variety of environments and settings, such as in mechanical rotary devices in order to provide a fluid-tight seal. The sealing assemblies are usually positioned about a rotating shaft or rod that is mounted in and protrudes from a stationary mechanical housing. The conventional rotary seal has limited flexibility on the choice of seal elements for rotary regenerative heat exchangers when they are exposed to harsh effluent, erosive, and corrosive fluids and environmental effects. Further, the conventional rotary seal requires complicated, expensive, and time-intensive installations, and extensive familiarity or customization of sealing dimensionality, which can require in many instances an extensive replacement schedule of one or more sealing parts and elements. Hence, conventional seals have limited capability for selecting, customizing, or comparing material choices based on the rotary device, heat exchanger, power plant requirements, or intended application.

Therefore, what is needed is a radial seal assembly that reduces installation time, reduces frequency of replacement, increases travel distance of the seal, increases selectivity options, increases resistance to harsh corrosive environments, and reduces downtime during maintenance, or partial or full non-functionality of one or more boilers.

BRIEF SUMMARY

In one aspect of the disclosure described herein, a radial seal and seal mount are disclosed for a heat exchanger having a configuration and properties that improve the travel distance of the sealing element, reduces installation time, reduces frequency of replacement, increases travel distance of the seal, increases selectivity options, and increases resistance to harsh corrosive environments. In addition, the radial seal is further configured to improve air duct, improve chamber sealing, and improve emissions flow, among other advantages.

In another aspect of the disclosure described herein, a radial seal assembly is disclosed including a mount having a first upstanding region and a first arcuate region. Here, the first upstanding region can be configured to couple to a rotary vane. The assembly can further include a flexible seal including a second arcuate region, and the first arcuate region of the mount being configured to at least partially receive the second arcuate region of the flexible seal. Further, the mount can include a first protrusion, wherein the first protrusion is configured to engage a first end of the flexible seal. Here, the first protrusion can be within the arcuate region of the mount. The flexible seal can further include a second upstanding region relative to a vertical plane. In addition, the flexible seal can further include a second end having a tilted region relative to the vertical plane, wherein the tilted region joins the second upstanding region. Here, the flexible seal can further include a flat region relative to a horizontal plane, wherein the flat region joins the second upstanding region. Also, the second arcuate region can be comprised of a sloped region and the flat region, wherein the sloped region and flat region include an acute angle relative to each other.

In another aspect of the disclosure described herein, a radial seal assembly is disclosed. The radial seal assembly can include a mount having a first upstanding region and a first arcuate region configuration, wherein the first arcuate region further comprises a protrusion. Further, the mount can be configured to couple to a diaphragm of a heat exchanger. In addition, the radial seal assembly can include a flexible seal having a first end and a second end. The flexible seal can further include a second arcuate region. Here, the first arcuate region of the mount can be configured to receive the second arcuate region of the flexible seal and engage the first end of the flexible seal. Further, the second end of the seal can be configured to contact a sector plate of the heat exchanger. In addition, the mount can further include a slot for receiving a fastener, wherein the slot is configured such that a position of the mount is configurable relative to the sector plate. In addition, the mount can further include a securement plate disposed over the slot. Here, the protrusion can be configured to secure the flexible seal within the first arcuate region of the mount. In addition, the mount can further include a notch or opening, wherein the notch or opening is configured to align with a projection on the diaphragm. Further, the first arcuate region configuration of the mount can substantially match the second arcuate region configuration of the flexible seal.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Figure 1A:
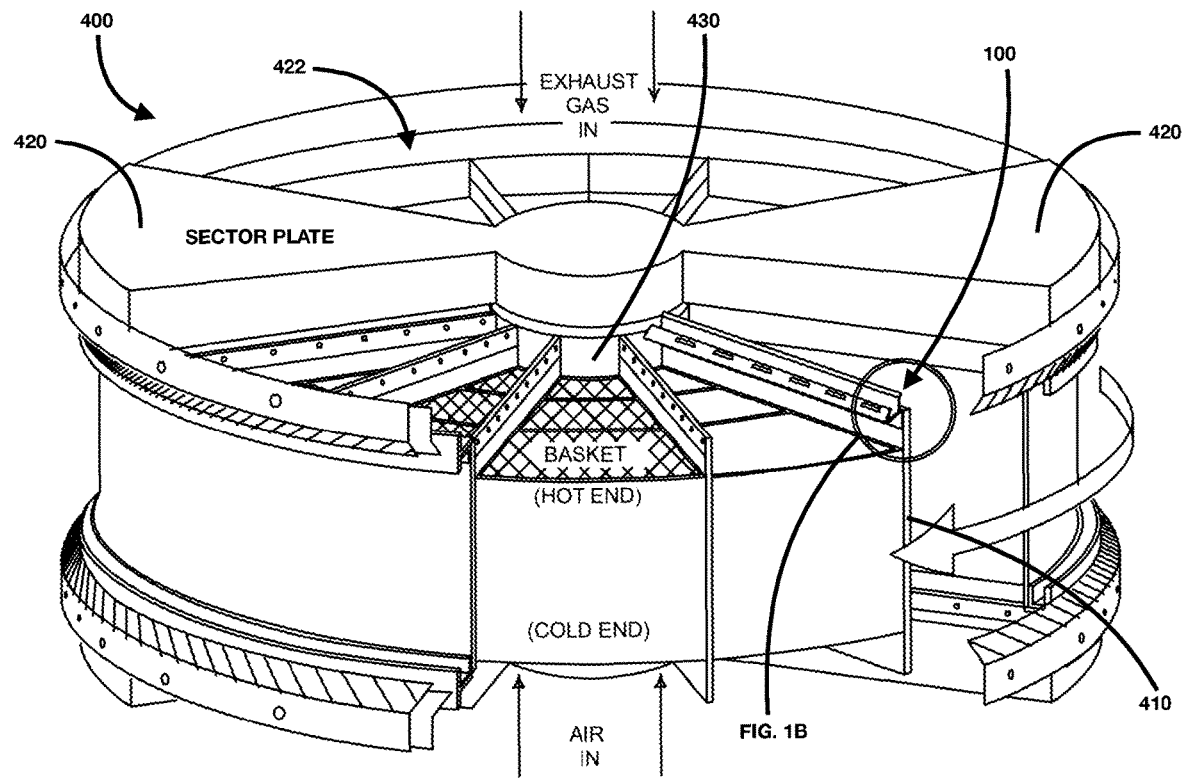
FIG. 1A illustrates a perspective and partial cross-sectional view for one non-limiting embodiment of a radial seal assembly having a radial seal and radial seal mount of the disclosure described herein installed on a diaphragm of a rotary air pre-heater.

FIG. 1A illustrates one embodiment for a rotary air pre-heater 400 for a furnace of a conventional power plant. The rotary pre-heater 400 includes a rotary regenerative heat exchanger having a hot-side (hot end) and a cold-side (cold end) that receives exhaust gas on its hot-side (via chambers 422) from one or more processes in order to heat intake air that will be directed to a furnace of a conventional power plant, such as for a coal, gas, or combo gas-fired power plant. The rotary pre-heater can further include a fixed sector plate 420 and a rotor 430 configured to rotate a diaphragm 410 about an axis. Here, diaphragm 410 may also be referred to herein as rotary vane(s), blade(s), plate(s), fin(s), or the like.

Still referring to FIG. 1A, a radial seal assembly 100 of the disclosure is shown installed on to diaphragm 410 and positioned under sector plate 420, and further providing a seal between one or more compartments or passageways, such as via chambers 422. More specifically, the radial seal assembly 100 can provide air flow separation between one or more sectors under various sector plates, such as between an air intake duct and an exhaust duct, as shown in FIG. 1A.

In addition, the radial seal assembly 100 can also isolate and separate bypass air flow between sectors of a duct and/or between air intake ducts and air exhaust intake duct.

Figure 1B:
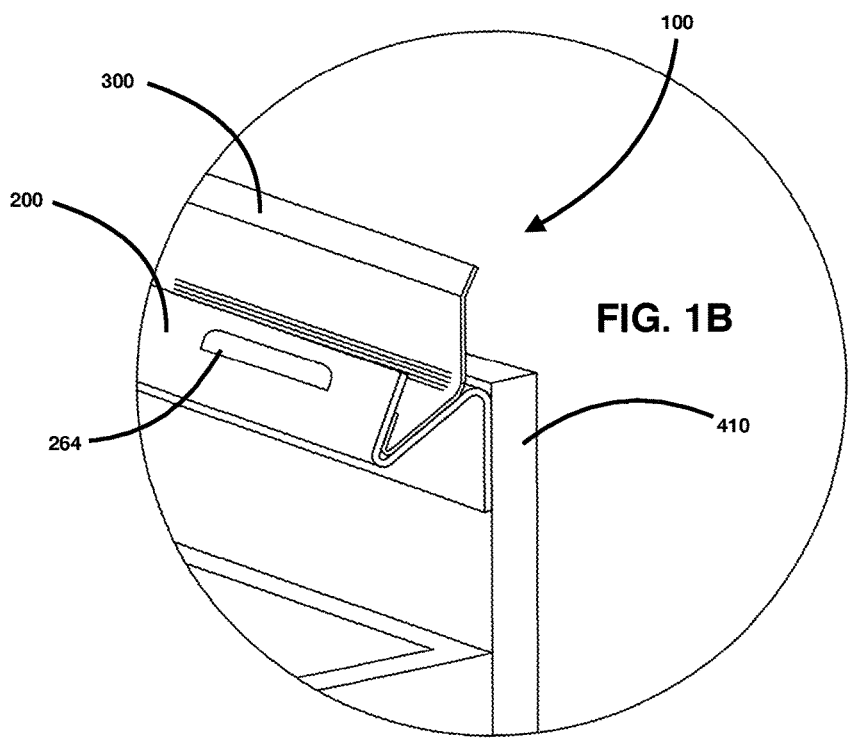
FIG. 1B illustrates a close-up perspective view of the radial seal and seal mount of FIG. 1A.

FIG. 1B illustrates a close-up view of the the radial seal assembly 100. The radial seal assembly can be comprised of include an axial or radial seal 300 and a seal mount 200, wherein seal 300 is installed thereon, coupled to, or secured to mount 200. Mount 200 further includes an engagement member 264 configured to secure seal 300 to mount 200 via a snap-fit, snap-lock, or friction hold configuration, which will be described in more detail later in this disclosure. Mount 200 is further shown secured to diaphragm 410 of the pre-heater 400. Here, it is contemplated within the scope of the disclosure that mount 200 can also be referred to herein as a holder, base, clamp, clip, bracket, securement member, or the like. Mount can also have rigid and non-flexible properties and be made of materials such as various metallurgical alloys or eighteen (18) gauge steel, or the like. Seal 300 can have bendable, flexible, stretchable, or elastic properties, wherein the seal can further be made of any material including but not limited to rubber, polymers, polyurethane, elastomers, FEP, silicone, Nitrile, polyimide, fluoroelastomer, polyimide glass-filled laminate, Norprene®, laminated film, composite, or any combination thereof.

Figure 2:
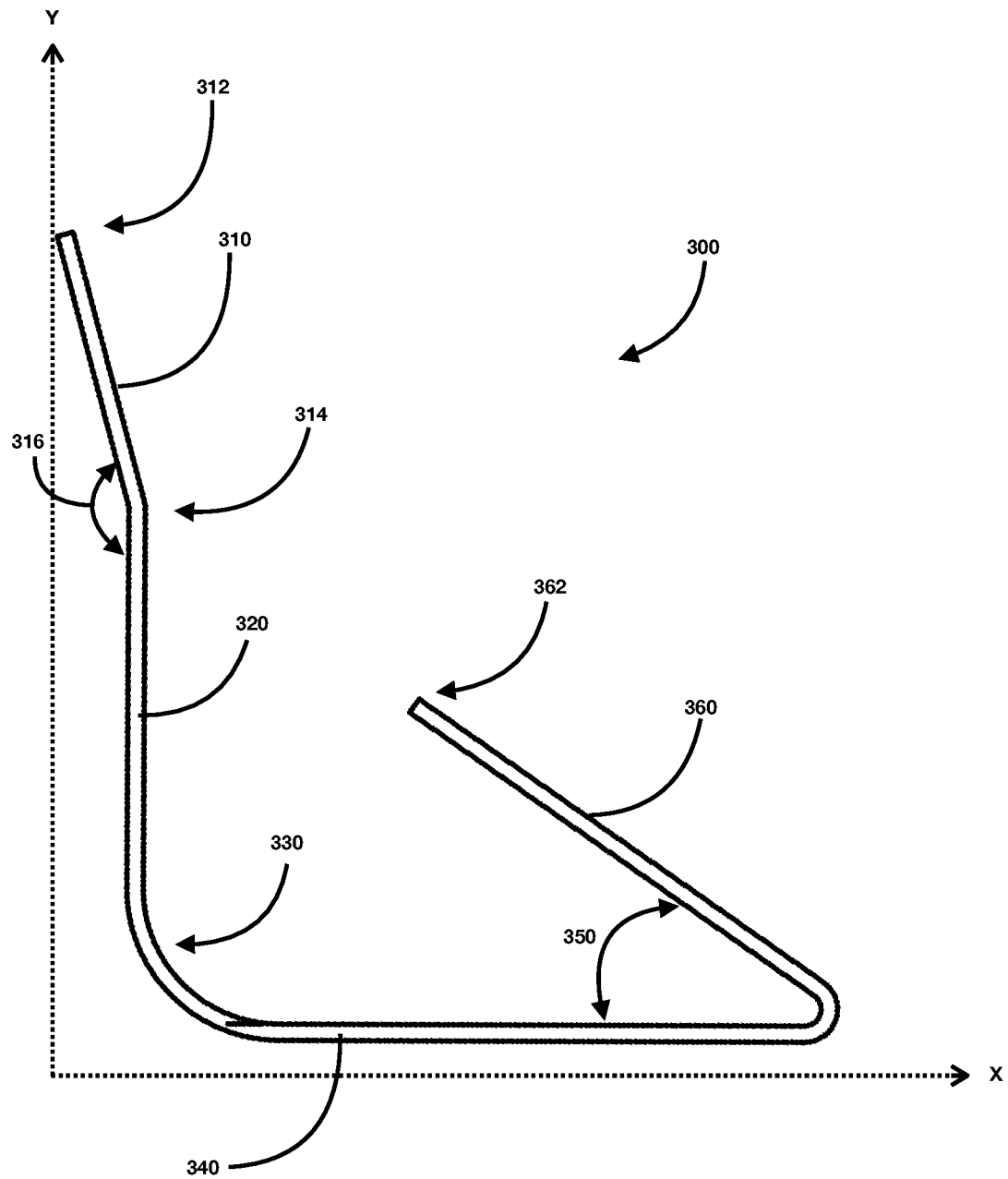
FIG. 2 illustrates a side view of the radial seal of the disclosure described herein.
Figure 3A:
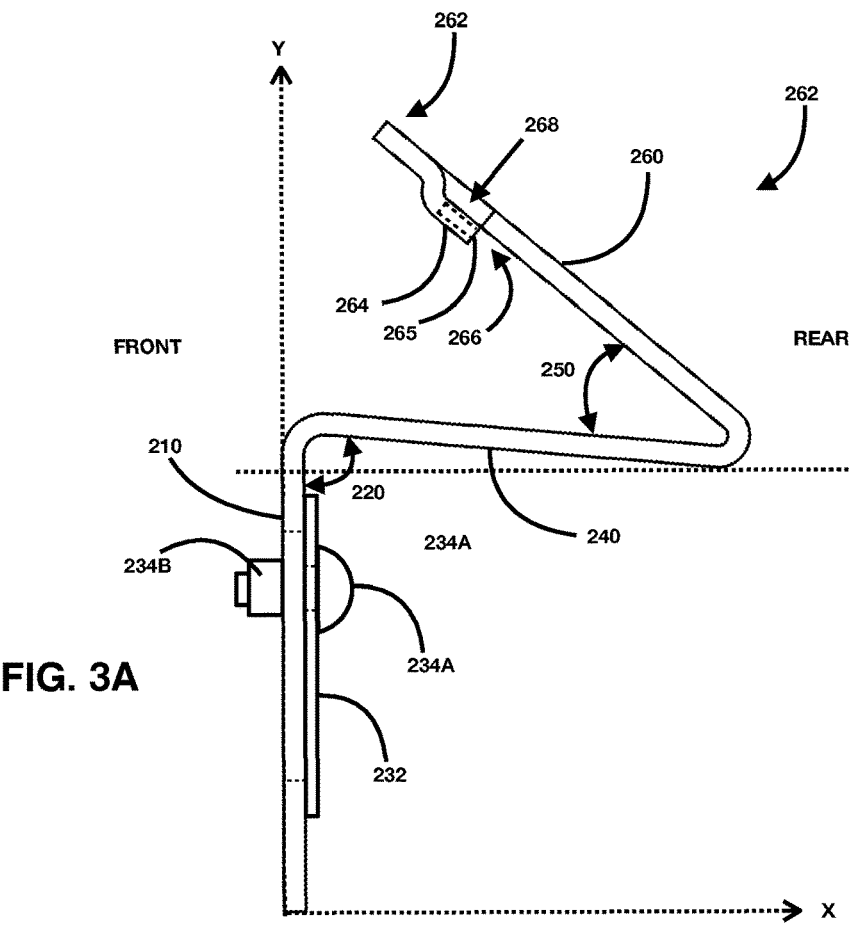
FIG. 3A illustrates a side view of the radial seal mount of the disclosure described herein.

FIG. 2 illustrates a side view of radial seal 300 of the disclosure described herein. Here, seal 300 is shown with respect to horizontal and vertical imaginary planes or an imaginary x-y axis for illustrative purposes. More specifically, seal 300 includes a partially angled member 310 having an end portion 312. Member 310 joins an upright member 320 at a break or peak 314, wherein member 320 and 310 form an obtuse angle 316 of approximately 160° to 180°, preferably 165°, with respect to each other. Member 320 further includes a curvilinear configuration around curved area 330 that further joins a downward sloping member 340. More specifically, Member 320 can pivot about arched area 330 with respect to member 340, wherein area 330 can operate as a hinge, pivot point, or biasing member. Member 340 further joins with rising member 360, wherein member 340 and 360 form an acute angle 350 of approximately 30° to 40°, preferably 37°, with respect to each other. In addition, member 360 includes end 362 that is configured to engage engagement member 264 of mount 200, as shown in FIG. 3A. Here, it is contemplated within the scope of the disclosure herein that the aforementioned members 310-360 form one unitary piece as seal 300, or in the alternative, one or more members 310-360 can be independent pieces combined with each other to form seal 300.

Figure 3B:
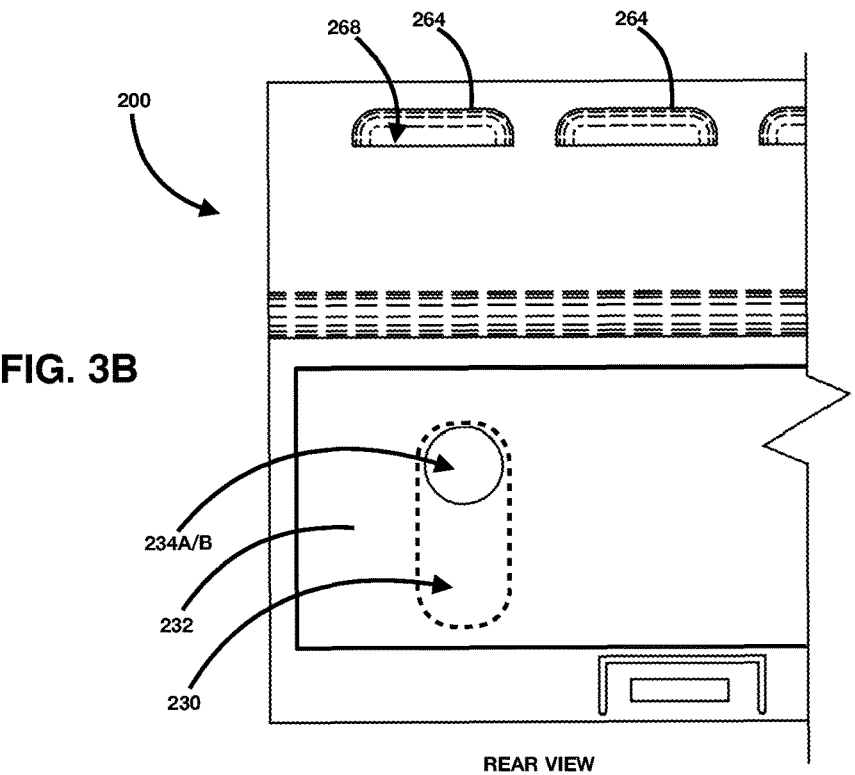
FIG. 3B illustrates a partial rear view of the radial seal mount of the disclosure described herein.

FIGS. 3A-3B illustrate one embodiment for a mount 200 of the disclosure described herein. Here, mount 200 is shown with respect to horizontal and vertical imaginary planes or an x-y imaginary axis for illustrative purposes. More specifically, mount 200 includes upright member 210 that further joins with a downward sloping member 240. Here, member 210 and member 240 can have an angle 220 of approximately 80° to 120°, preferably 85°, with respect to each other. Member 240 further joins with rising member 260, wherein member 240 and 260 can have an acute angle 250 of approximately 30° to 40°, preferably 35°, with respect each other. More specifically, the interior face configuration of members 240 and 260 are configured to substantially match that of seal 300 to provide for a tight and secure fit for seal 300 within mount 200, as shown in FIGS. 4A-4B.

Still referring to FIGS. 3A-3B, member 260 of mount 200 further includes engagement member 264. Here, engagement member 264 can also be referred to herein as a stop, abutment, catch, receiving, slot, or female member. In operation, end portion 362 of seal 300 is configured to abut against the edges of outer walls 265 of the engagement member. Further, engagement member 264 includes an opening or slot 266 therein. For example, in another embodiment, seal 300 can include an extended tab (not shown) that is received by and within slot 266 of engagement member 264. In addition, in one embodiment, engagement member 264 can be formed via stamping region 268 of member 266, wherein region 268 forms an indentation within member 260. However, it is contemplated within the scope of the disclosure described herein that any other method of manufacture can also be used, such as injection molding. Mount 200 also includes aperture or slot 230 for threading or passing a fastener 234A/B there through, such as a bolt or screw.

Figure 4A:
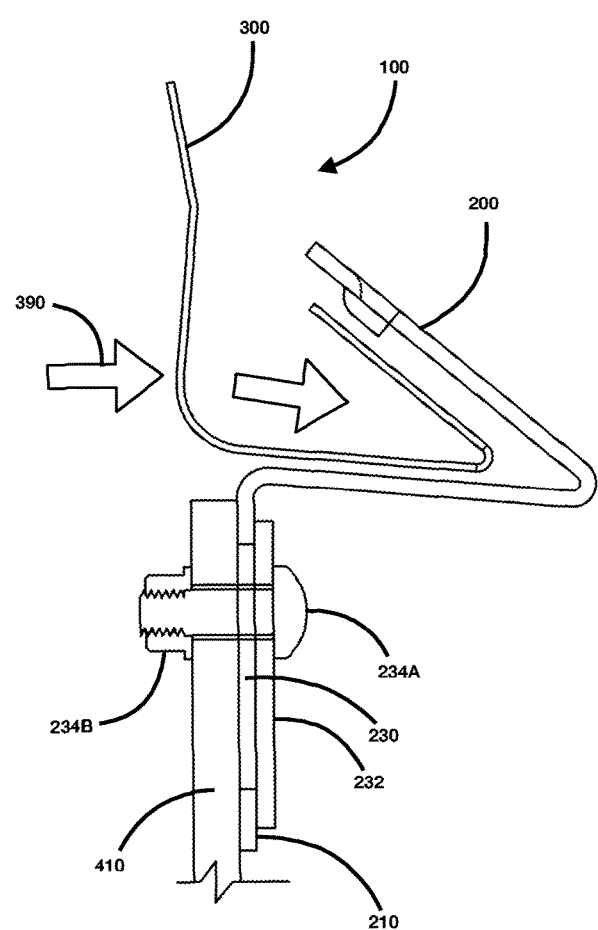
FIG. 4A illustrates a side view of the radial seal and radial seal mount of the disclosure, further illustrating the radial seal prior to the seal being installed onto the radial seal mount.
Figure 4B:
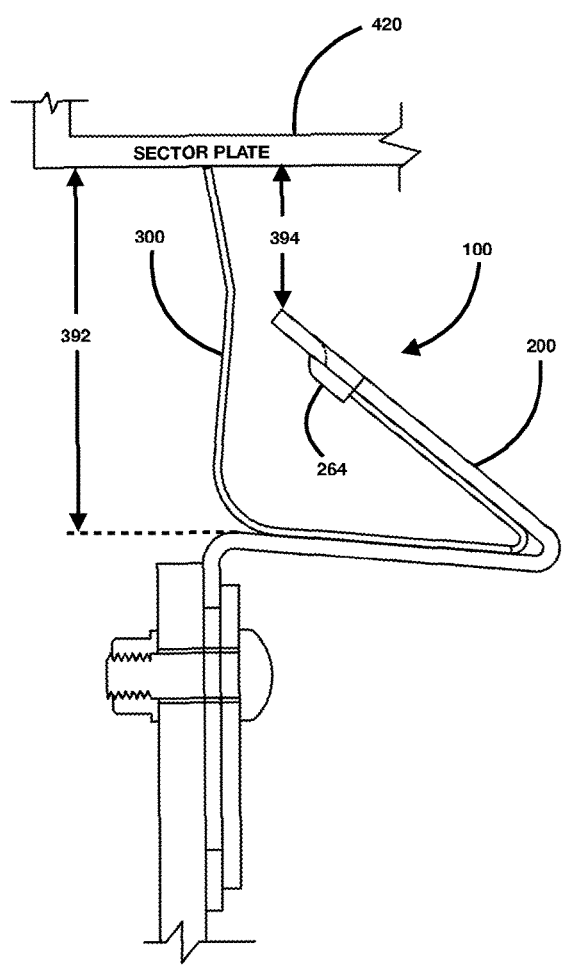
FIG. 4B illustrates a side view of the radial seal and radial seal mount of the disclosure described herein, further illustrating the radial seal after being secured to the seal mount.

FIGS. 4A-4B illustrate a method of installing seal 300 onto mount 200. More specifically, member 210 of mount 200 is secured to diaphragm 410 of the pre-heater. Here, mount 200 can also include a holding plate 232 disposed over mount 200, wherein bolt 234A and nut 234B secure plate 232 and mount 200 to diaphragm 410. Here, seal 300 can be slid into the interior of mount 200 via the direction of arrows 390. Once the seal is positioned within mount 200, it can be snapped securely into place via a friction tight fit of the exterior faces of member areas 340, 360, 362 of seal 300 pressed against (or wedged in-between) the interior faces of members 240, 260, and 264 of mount 200. Here, engagement member 264 further operates as a stopping member. More specifically, the unique combination of the engagement member 264, sloped member 240, and angle member 260 assists in firmly securing seal 300 in place without slippage or unintended removal. Further, the installation of seal 300 within mount 200 does not require additional tools and may be performed manually by hand. In addition, seal 300 may also be easily removed from mount 300 by releasing end portion 362 from engagement member 264. Further, the height, elevation, or clearances 392 and 394 of mount 200 with respect to the sector plate can be adjusted, positioned, and calibrated via the combination of elongated slot opening 230, plate 232, and fastening member 234A/B, such that seal 300 is in contact with the underneath surface of sector plate 410, which will also be described again in more detail later in this disclosure. Here, slot 230 is within mount 200.

Figure 5:
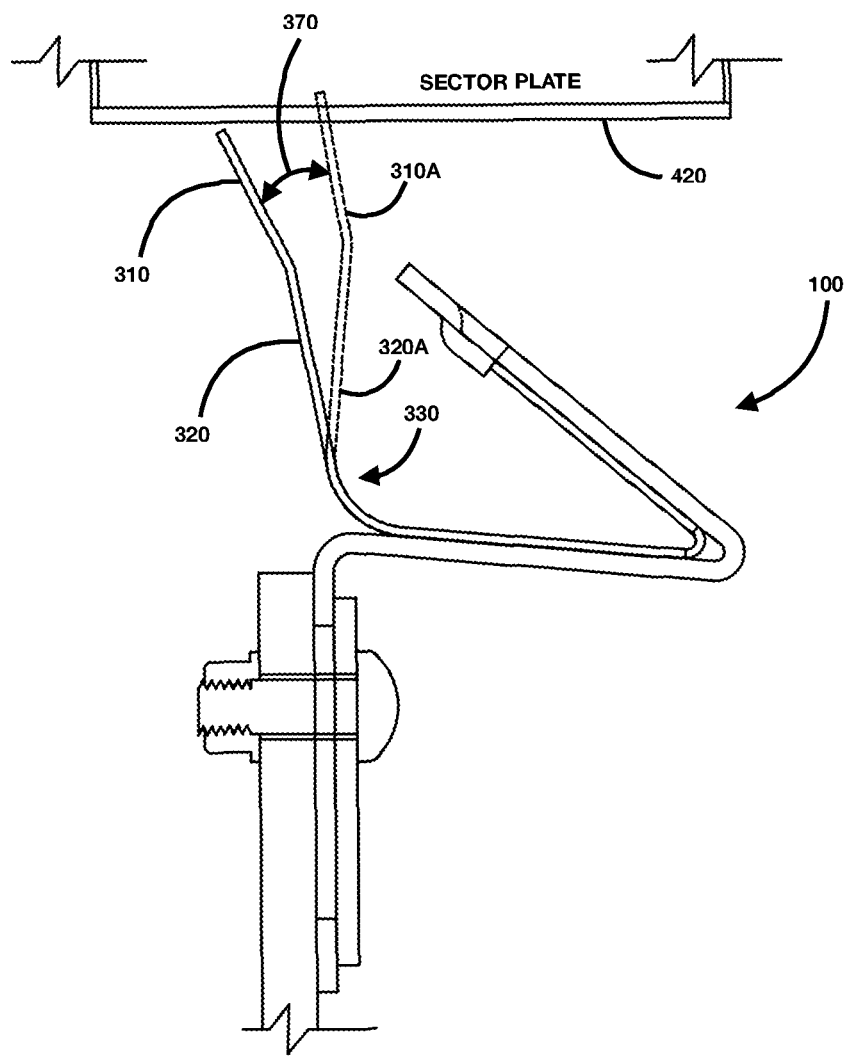
FIG. 5 illustrates a side view of the radial seal and seal mount, further illustrating in one non-limiting embodiment a path of deflection of the radial seal when engaged with a sector plate of the rotary air pre-heater.

FIG. 5 illustrates one embodiment for a path of deflection of seal 300 when in contact with a sector plate, such as sector plate 420. More specifically, as diaphragm 410 rotates about an axis, it brings member 310 of seal 300 in direct contact with the sector plate, and subsequently deflecting or pivoting the members 310 and 320 of seal 300 in a direction opposite that of the rotational direction of diaphragm 410. In particular, members 310 and 320 can deflect from an original non-contact position of 310A and 320A to a deflected position by an angle 370 of approximately 25° to 30°, depending on factors such as the rotational speed of the diaphragm or environmental conditions, among others.

Figure 6:
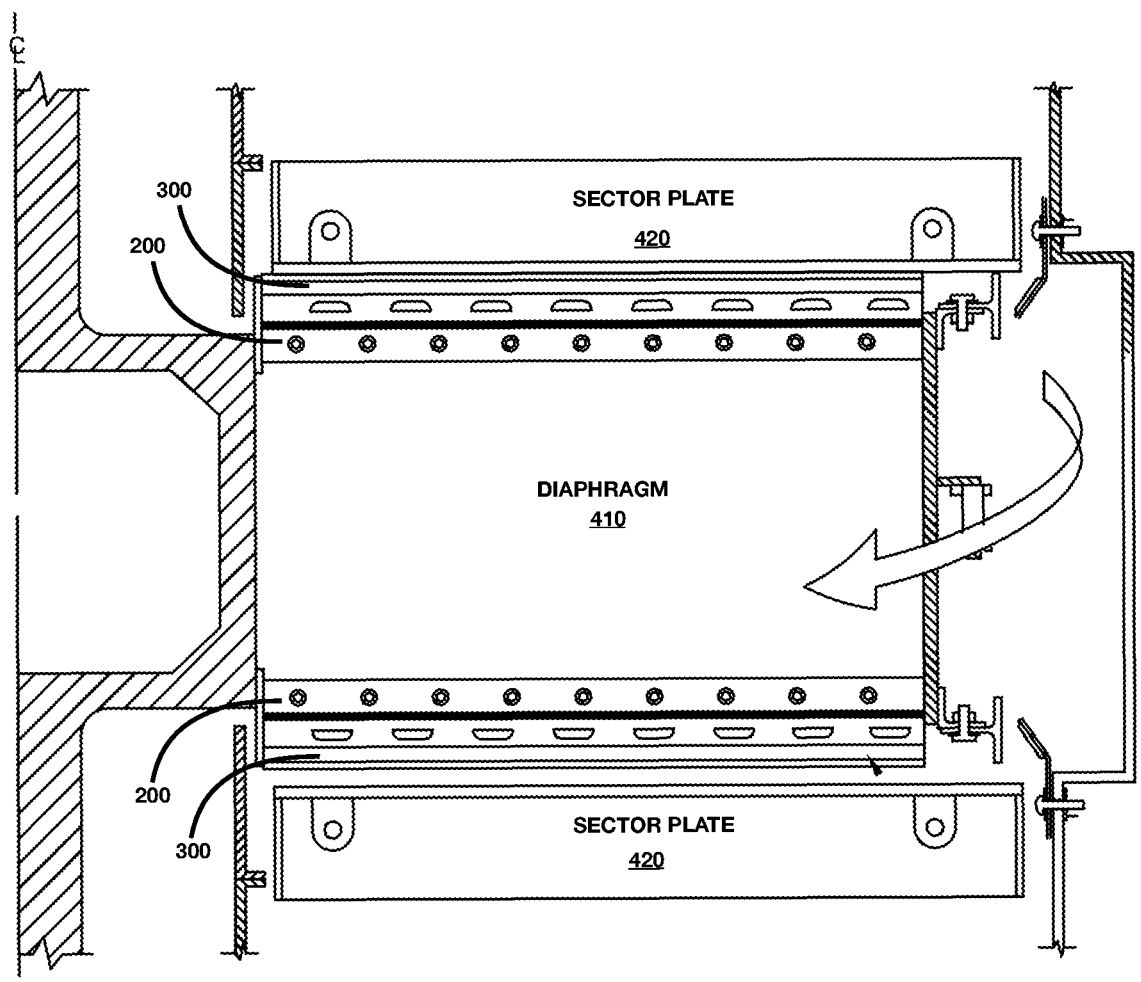
FIG. 6 illustrates a cross-sectional view of the rotary air pre-heater, further illustrating a front view of the seal mount secured to a diaphragm of the rotary air pre-heater.

FIG. 6 illustrates a partial cross-sectional view of the rotary pre-heater. Here, diaphragm 410 and top and bottom mounts 200 are shown, each having a top and bottom seal 300 for illustrative purposes. More specifically, top and bottom mounts 200 can be secured to both top and bottom end portions of diaphragm 410, respectively. Further, one advantage of seals 300 are that they can be installed into mounts 200 at a pre-calibrated elevation (or pre-calibrated gap space between the sector plate and mount 200) without the use of a seal setting bar. Still referring to FIG. 6, for illustrative purposes, the top seal 300 is shown in contact with a top sector plate 420, and the bottom seal 300 is shown not in contact a bottom sector plate 420.

Referring back to FIG. 3B, FIG. 4B and FIG. 6, seal 300 of the disclosure described herein can be a contact or non-contact radial or axial seal that can be set at a calibrated elevation so as to or not to interfere with the elevation of one or more sector plates or spokes. More specifically, the elevation of seal 300 and mount 200 can be dynamically adjusted and/or pre-set via the slot 230 of mount 200, and further secured in place via plate 232 and fasteners 234A/B, wherein plate 232 can include an aperture for receiving fasteners 234A/B. For a non-contact radial or axial seal 300, the seal 300 can be set at a calibrated elevation such that it comes close to the elevation of the sector plate without making actual contact with the sector plate. Another advantage of seals 300 is that they do not require the use of additional fasteners or adhesives to be installed onto mounts 200, and can be securely held in place via the unique configuration of the seal 300 and mount 200 of the disclosure described herein. Hence, this allows for simple and easy replacement of seals 300 at any time without intrusive removal or re-installation techniques. In addition, since the mount 200 had been previously calibrated and secured in position, the re-installation of the seal does not require any new or additional height or elevation calibration of either the mount or the replacement seal.

Figure 7A:
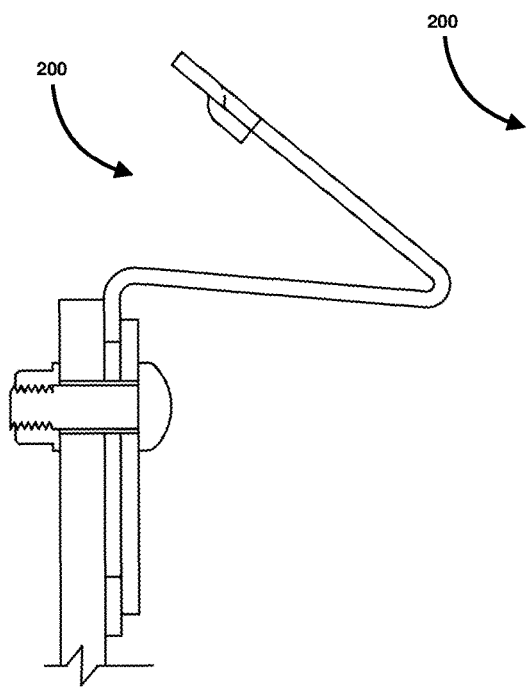
FIG. 7A illustrates another side view of the seal mount of the disclosure described herein.
Figure 7B:
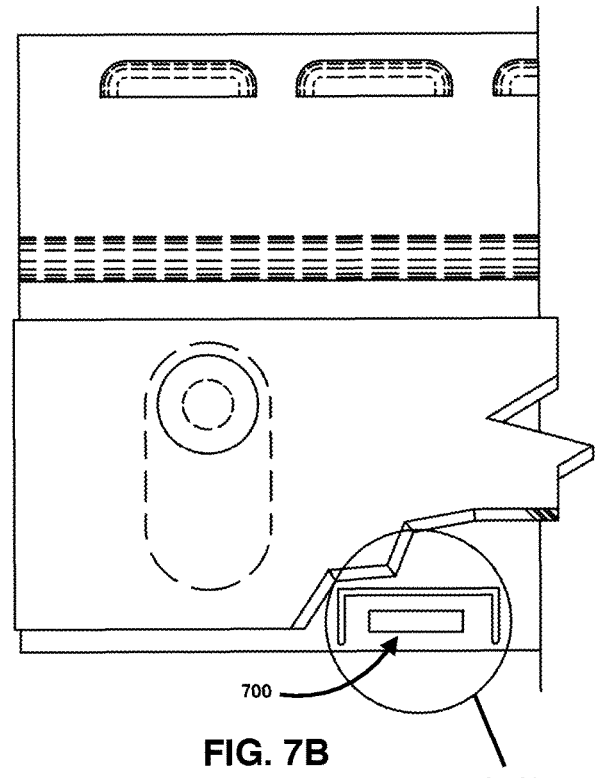
FIG. 7B illustrates another partial rear view of the seal mount of the disclosure described herein, further illustrating a pre-calibrated position of a tab.
Figure 7C:
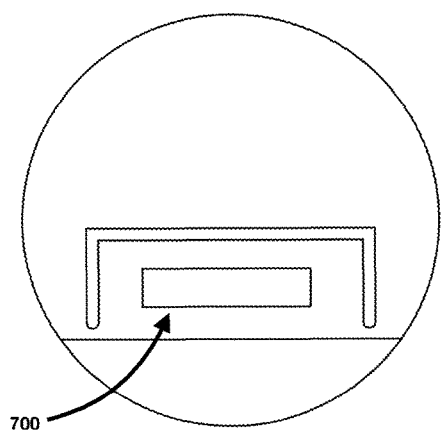
FIG. 7C illustrates a partial rear view of a pre-calibrated position of the tab prior to welding to the diaphragm.
Figure 7D:
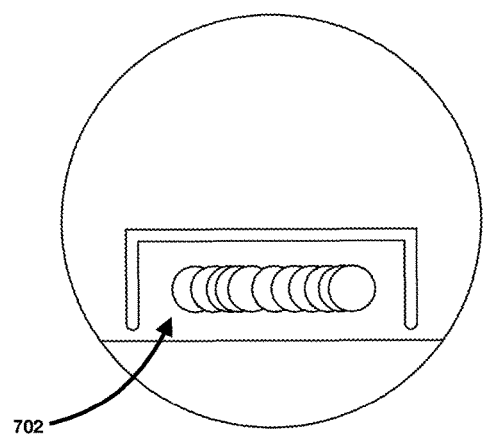
FIG. 7D illustrates a partial rear view of a pre-calibrated position of the tab after welding to the diaphragm.

FIGS. 7A-7C illustrates one non-limiting embodiment for a method of installing and securing mount 200 to diaphragm 410. More specifically, mount 200 may also include a pre-calibration position protrusion, stop, catch, or tab 700 that can provide for or act as an alignment guide for positioning the mount 200 at a pre-defined position with respect to the sector plate and diaphragm. Once the position of mount 200 is set or secured in place, mount 200 can further be welded into place via tab 700 or a spot weld. FIG. 7C illustrates a close-up of the tab prior to welding and FIG. 7D illustrates a close-up of the tab after welding.

Figure 8A:
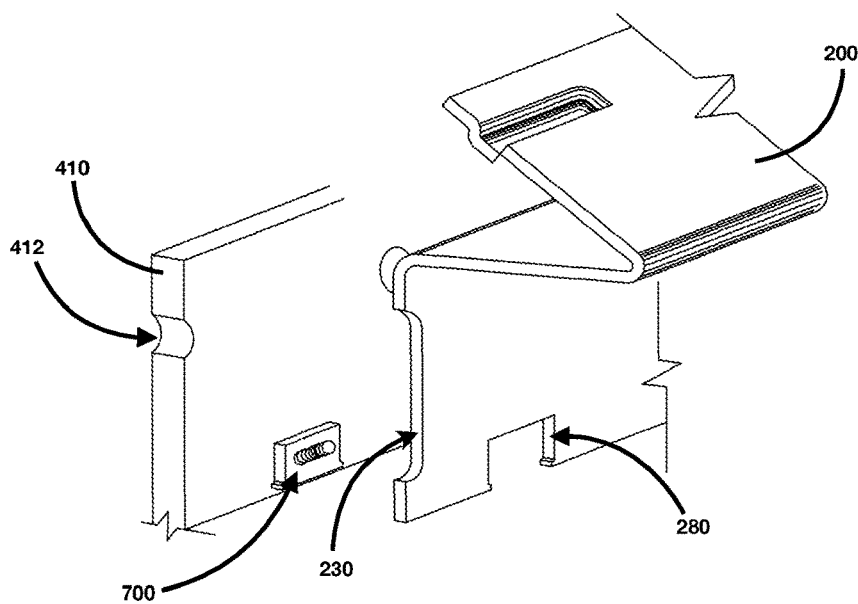
FIGS. 8A-8B illustrates perspective cross-sectional views of the seal mount and diaphragm.
Figure 8B:
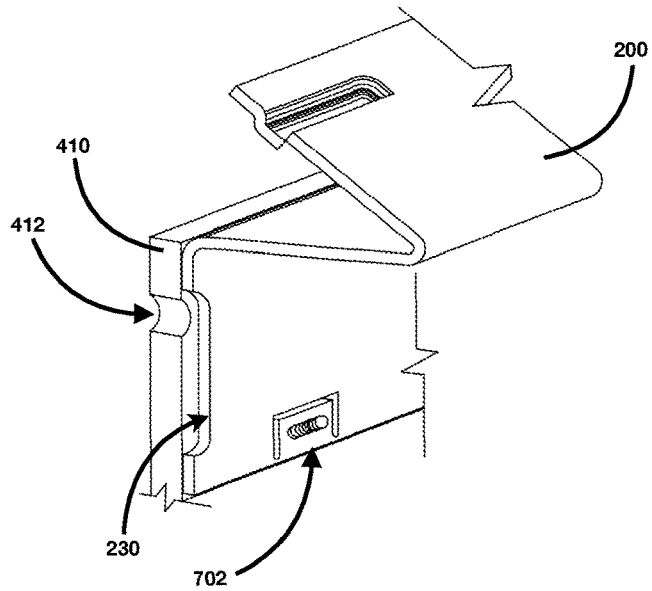
Figure 8C:
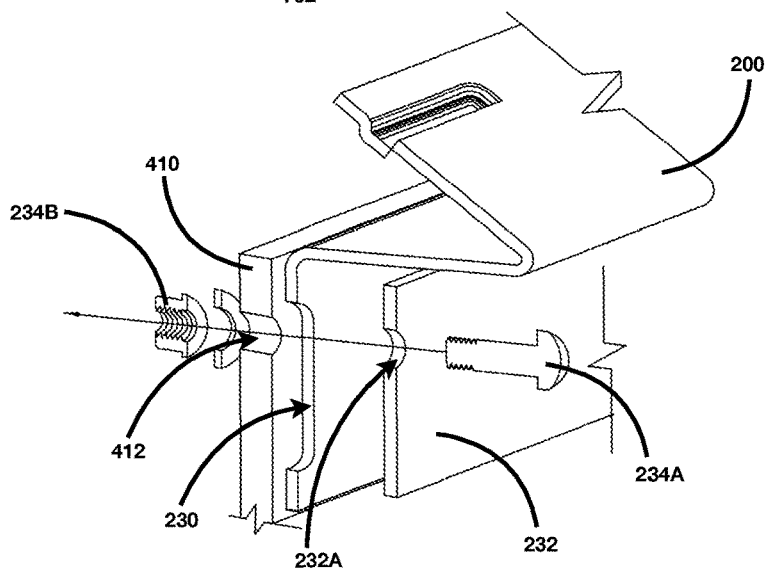
FIG. 8C illustrates a perspective cross-sectional exploded view of the seal mount, diaphragm, plate, and fasteners.

FIGS. 8A-8C illustrate a perspective view for one non-limiting embodiment for a method of installing the seal mount to the diaphragm. Specifically, tab 700 can be welded, mounted, or installed onto diaphragm 410 in order to provide a pre-calibrated position or operate as a guide for mount 200. Here, an opening, groove, or notch 280 on mount 200 can be aligned with and placed over tab 700, thereby setting, aligning, or positioning mount into a pre-calibrated position. In addition, slot 230 (cross-section shown) of mount 200 can further be aligned with aperture 412 (cross-section shown) of diaphragm 410. Once mount 200 is positioned in place and set at the proper height, tab 700 and notch 280 can then be welded together, if needed. In addition, mount 200 can be attached to diaphragm 410 by placing plate 232 over slot 230 and aligning an aperture 232A (cross-section shown) of plate 232 with slot 230 of mount 200 and aperture 412 of diaphragm 410, and further securing the aforementioned components together via nut, washer, and bolt fasteners 234A and 234B. However, it is contemplated within the scope of the disclosure described herein that other fastening mechanisms may also be used, such as screw, weld, or adhesives. Further it is contemplated within the scope of the disclosure described herein that in an alternative embodiment mount 200, slots 230 and aperture 412 can first be aligned, positioned, and set prior to tab 700 being positioned, secured, and welded into place through notch 280. In one embodiment, notch 280 can be water jetted, laser cut, or punched into a c-shape notch thereby allowing the notch to be plug welded through its opening to diaphragm 410. In this embodiment, when the mount is removed (such as during a basket change out of the heat exchanger), the notch 280 can break off the welded-in tab 702, wherein tab 702 can remain on diaphragm 410 thereby serving as a relocating or alignment guide for the same or replacement mount.

While specific embodiments have been shown and discussed, various modifications may of course be made, and the disclosure described herein is not limited to the specific forms or arrangement of parts described herein, except insofar as such limitations are included in the following claims. Further, it will be understood that certain features and sub-combinations are of utility and may be employed without reference to other features and sub-combinations. This is contemplated by and is within the scope of the claims.

What is claimed is:

1. A radial seal assembly, comprising:
    a mount comprising an upright member, an extending member and an angled member, wherein the extending member and the angled member define a first arcuate region of the mount that contains an acute angle formed between the extending member and the angled member;
    the mount further comprising an engagement member, wherein the engagement member protrudes from the angled member, and wherein the upright member is configured to couple to a rotary vane;
    a flexible seal comprising a first end, a first member and a rising member, wherein the first member and rising member define a first arcuate region of the flexible seal that contains an acute angle formed between the first member and the rising member; and wherein
    the first arcuate region of the mount at least partially receives therein the first arcuate region of the flexible seal and wherein the first end of the flexible seal abuts the engagement member, such that the flexible seal is secured to the mount.

2. The radial seal assembly of claim 1, wherein the engagement member is further comprised of an indentation on the surface of the mount.

3. The radial seal assembly of claim 1, wherein the flexible seal is secured to the mount via a friction hold or snap fit.

4. The radial seal assembly of claim 1, wherein the flexible seal further comprises an upright member.

5. The radial seal assembly of claim 4, wherein the flexible seal further comprises a second end having a tilted member relative to the vertical plane, wherein the tilted member loins the upright member of the flexible seal.

6. The radial seal assembly of claim 4, wherein the first member of the flexible seal further joins the upright member of the flexible seal.

7. A radial seal system, comprising:
    a bracket comprising an upright member, a first arcuate region formed by an extending member and an angled member and having an acute angle between the extending member and the angled member;
    an engagement member, wherein the engagement member protrudes from the angled member;
    the upright member is configured to couple to a rotary vane;
    a flexible seal comprising a first arcuate region formed by a first member and a rising member and having an acute angle formed between the first member and the rising member, wherein the flexible seal further comprises a first end and a second end; and
    the first arcuate region of the bracket configured to at least partially receive the first arcuate region of the flexible seal, and wherein the first end of the flexible seal abuts the engagement member, such that the flexible seal is secured to the bracket and the second end of the flexible seal extends above the angled member of the bracket.

8. The radial seal system of claim 7, wherein the engagement member is further comprised of an indentation on the surface of the mount.

9. The radial seal system of claim 7, wherein the flexible seal is secured to the mount via a friction hold or snap-fit.

10. The radial seal system of claim 7, wherein the flexible seal further comprises an upright member.

11. The radial seal system of claim 10, wherein the second end of the flexible seal comprises a tilted member relative to the vertical plane, wherein the tilted member loins the upright member of the flexible seal.

* * * * *